US010710426B2

United States Patent
Chikagawa

(10) Patent No.: US 10,710,426 B2
(45) Date of Patent: Jul. 14, 2020

(54) VEHICLE AIR CONDITIONER

(71) Applicant: MITSUBISHI HEAVY INDUSTRIES THERMAL SYSTEMS, LTD., Minato-ku, Tokyo (JP)

(72) Inventor: Noriyuki Chikagawa, Aichi (JP)

(73) Assignee: MITSUBISHI HEAVY INDUSTRIES THERMAL SYSTEMS, LTD., Tokyo (JP)

( * ) Notice: Subject to any disclaimer, the term of this patent is extended or adjusted under 35 U.S.C. 154(b) by 200 days.

(21) Appl. No.: 14/649,106

(22) PCT Filed: Dec. 25, 2013

(86) PCT No.: PCT/JP2013/084605
§ 371 (c)(1),
(2) Date: Jun. 2, 2015

(87) PCT Pub. No.: WO2014/115471
PCT Pub. Date: Jul. 31, 2014

(65) Prior Publication Data
US 2016/0023533 A1 Jan. 28, 2016

(30) Foreign Application Priority Data
Jan. 24, 2013 (JP) .................... 2013-011270

(51) Int. Cl.
*B60H 1/00* (2006.01)
(52) U.S. Cl.
CPC ..... *B60H 1/00564* (2013.01); *B60H 1/00021* (2013.01); *B60H 1/00521* (2013.01); *B60H 1/00792* (2013.01); *B60H 2001/00085* (2013.01)

(58) Field of Classification Search
CPC ........... H05K 7/20736; H05K 7/20836; B60H 1/00564; B60H 1/00021; B60H 1/00521; B60H 1/00792; B60H 2001/00085
(Continued)

(56) References Cited

U.S. PATENT DOCUMENTS

| 5,868,312 | A | 2/1999 | Feldt | |
| 2012/0057993 | A1* | 3/2012 | Chikagawa | ............... F04F 5/20 417/54 |

FOREIGN PATENT DOCUMENTS

| JP | 2-6212 A | 1/1990 |
| JP | 4-50021 A | 2/1992 |

(Continued)

OTHER PUBLICATIONS

JP2001097031A_MT; Kuno, Yasunori, Aspirator, Apr. 10, 2001.*
(Continued)

*Primary Examiner* — Grant Moubry
*Assistant Examiner* — Ryan L Faulkner
(74) *Attorney, Agent, or Firm* — Birch, Stewart, Kolasch & Birch, LLP

(57) ABSTRACT

A vehicle air conditioner which introduces a sufficient amount of primary air without providing a guide, and possible to install an aspirator in a large area in a downstream region of an air-mixing damper while avoiding interference with a mode-switching damper or the like and includes a case main unit of an air conditioning unit, an aspirator that introduces air circulating in an air channel at an interior of the case main unit as primary air and that sucks in air in a vehicle cabin as secondary air via an installation portion of an indoor temperature sensor, the case main unit is provided with a boss portion that communicates with the air channel at the interior of the case main unit and protrudes diagonally outward so as to face an air-circulation direction,
(Continued)

and a primary-air introducing unit of the aspirator is installed by being diagonally inserted into the boss portion.

2 Claims, 3 Drawing Sheets

(58) Field of Classification Search
USPC ....... 454/184, 156, 236, 247, 103, 228, 200, 454/188, 139, 152, 117, 105
See application file for complete search history.

(56) References Cited

FOREIGN PATENT DOCUMENTS

| JP | 4-50022 A | 2/1992 | | |
|---|---|---|---|---|
| JP | 10-100636 A | 4/1998 | | |
| JP | 2001-97031 A | 4/2001 | | |
| JP | 2001097031 | * | 4/2001 | ............... B60H 1/32 |
| JP | 2003-320844 A | 11/2003 | | |
| JP | 2004-123077 A | 4/2004 | | |
| JP | 2004-322721 A | 11/2004 | | |
| JP | 2005-335413 A | 12/2005 | | |
| JP | 2006-282080 A | 10/2006 | | |
| JP | 2007-314056 A | 12/2007 | | |
| JP | 2008-81086 A | 4/2008 | | |
| JP | 2008-162475 A | 7/2008 | | |
| JP | 2011-6022 A | 1/2011 | | |
| KR | 97-34340 A | 7/1997 | | |

OTHER PUBLICATIONS

Kitamura, Fumiaki, "JPH10100636 Translation".pdf, Air Conditioner for Vehicle, Apr. 1998, pp. 1-15.*
Japanese Decision to Grant a Patent, dated Oct. 4, 2016, for Japanese Application 2013-011270.
Japanese Office Action dated Jul. 5, 2016, for Japanese Application No. 2013-011270, including an English translation.
Office Action issued in Chinese Application No. 201380069271.6, dated Jan. 25, 2017.

* cited by examiner

--RELATED ART--

VEHICLE AIR CONDITIONER

TECHNICAL FIELD

The present invention relates to a vehicle air conditioner provided with an aspirator that introduces air in a vehicle cabin to an installation portion of an indoor temperature sensor that detects temperature in the vehicle cabin.

BACKGROUND ART

In the related art, in order to introduce air in a vehicle cabin to an installation portion of an indoor temperature sensor that detects temperature in the vehicle cabin, a vehicle air conditioner employs an aspirator that decreases pressure by means of the Venturi effect. The aspirator is provided with a nozzle that sucks in, as secondary air, the air in the vehicle cabin via the installation portion of the indoor temperature sensor, a main unit that forms an air channel so as to surround the outer circumference of this nozzle, a primary-air introducing unit that introduces, as primary air, a portion of an airflow circulating inside an air conditioning unit into the air channel of the main unit, and a diffuser that is connected to an open end of the main unit and that is configured such that the tip of the nozzle opens in the vicinity of a throat portion of the diffuser.

With such a vehicle air conditioner, in order to detect the temperature in the vehicle cabin with high precision, it is necessary to introduce a sufficient amount of vehicle interior air to the installation portion of the indoor temperature sensor, and, accordingly, it is necessary to introduce a sufficient amount of the primary air into the aspirator that sucks in the vehicle interior air as the secondary air. Therefore, as shown in FIG. 3, in order to guide a portion of an airflow flowing in the direction of an arrow Y in an air channel 2 in a case main unit 1 toward an aspirator 4, Patent Literature 1 discloses a unit in which a guide 3 protrudes into the air channel 2 from an area surrounding a primary-air introducing unit 5 of the aspirator 4.

On the other hand, in order to directly blow the primary air introduced into the aspirator into the vehicle cabin, it is desirable to introduce temperature-adjusted air, and, in this case, the aspirator needs to be installed in a region on the downstream side of an air-mixing damper. However, there are many restrictions related to the region on the downstream side of the air-mixing damper, because mode-switching dampers, means of enhancing the air-mixing performance, and so forth are installed therein, which makes it difficult to install an aspirator provided with a guide while avoiding interference with such equipment, and thus, it is necessary to employ a special structure, for example, by providing a through-hole for introducing the primary air into the aspirator at a rotation shaft of a mode-switching damper, as disclosed in Patent Literature 2.

CITATION LIST

Patent Literature

{PTL 1} Japanese Unexamined Patent Application, Publication No. 2004-322721
{PTL 2} Japanese Unexamined Patent Application, Publication No. 2008-81086

SUMMARY OF INVENTION

Technical Problem

As described above, when the performance of the aspirator is enhanced and the precision of detecting the temperature in the vehicle cabin is increased, it is necessary to increase the amount of the primary air introduced into the aspirator by providing a guide in the air channel. However, to provide a guide, one problem, among others, is that it is necessary to avoid interference with a mode-switching damper or the like, which restricts the installation position of the aspirator, and this becomes an impeding factor on the degree of freedom in terms of the layout of the air conditioning unit, thus adversely affecting the air-mixing performance, that is to say, the temperature control characteristics.

In order to install the aspirator in the region on the downstream side of the air-mixing damper, while avoiding interference with the mode-switching damper, the means for enhancing the temperature-adjustment controllability, or the like, a special structure must be employed, as disclosed in Patent Literature 2, and thus, there is a problem, among others, in that the structural complexity increases, resulting in an increase in costs.

The present invention has been conceived in light of the above-described circumstances, and an object thereof is to provide a vehicle air conditioner with which it is possible to introduce a sufficient amount of primary air without providing a guide, and additionally, in which it is possible to install an aspirator in a large area in a downstream region of an air-mixing damper while avoiding interference with a mode-switching damper or the like.

Solution to Problem

In order to solve the above-described problems, a vehicle air conditioner according to an aspect of the present invention employs the following solutions.

Specifically, the vehicle air conditioner according to the aspect of the present invention is a vehicle air conditioner including, in a case main unit of an air conditioning unit, an aspirator that introduces air circulating in an air channel at an interior of the case main unit as primary air and that sucks in, by means of a sucking effect of the primary air, air in a vehicle cabin as secondary air via an installation portion of an indoor temperature sensor, wherein the case main unit is provided with a boss portion that communicates with the air channel at the interior of the case main unit and that protrudes diagonally outward so as to face an air-circulation direction, and a primary-air introducing unit of the aspirator is installed by being diagonally inserted into the boss portion.

With the above-described aspect, because the case main unit of the air conditioning unit, in which the aspirator for introducing the air in the vehicle cabin to the installation portion of the indoor temperature sensor is installed, is provided with the boss portion that communicates with the air channel at the interior of the case main unit and that protrudes diagonally outward so as to face the air-circulation direction, and, because the primary-air introducing unit of the aspirator is installed by being diagonally inserted into the boss portion, by reducing the pressure loss due to bending of the airflow being guided from the air channel at the interior of the case main unit to the primary-air introducing unit of the aspirator, it is possible to introduce a sufficient amount of airflow into the aspirator as the primary air and to suck in, as the secondary air, a sufficient amount of the air in the vehicle cabin toward the installation portion of the indoor temperature sensor, even if a guide is omitted, and also, even if the internal static pressure is low. Therefore, it is possible to increase the detection precision of the temperature in the vehicle cabin and to enhance the temperature-adjustment controllability. Because it is possible to eliminate the need for a guide for introducing the primary air, it is possible to install the aspirator in a large area in the downstream region of the air-mixing damper without interfering with the mode-switching damper or the like, or without having to employ a special structure, and thus, it is possible to increase the degree of freedom in terms of the layout of the air conditioning unit and the degree of freedom for implementing measures for enhancing the air-mixing efficiency and the temperature-adjustment controllability.

With the vehicle air conditioner according to the aspect of the present invention, the boss portion in the above-described vehicle air conditioner may be disposed so as to diagonally face the air-circulation direction at an angle equal to or less than 60°.

With the above-described aspect, because the boss portion is disposed so as to diagonally face the air-circulation direction at an angle equal to or less than 60°, as compared with the one according to the related art in which the aspirator is installed by providing the boss portion in a direction that substantially perpendicularly intersects the air-circulation direction, it is possible to considerably reduce the pressure loss due to bending of the airflow guided to the primary-air introducing unit of the aspirator, and it is possible to introduce a sufficient amount of the primary air into the aspirator without having to provide a guide or the like. Therefore, it is possible to increase the degree of freedom in terms of the layout of the air conditioning unit and the degree of freedom for implementing the measures for enhancing the air-mixing efficiency and the temperature-adjustment controllability, while simplifying the configuration via the enhancement of the aspirator performance.

With vehicle air conditioner according to the aspect of the present invention, in any one of the above-described vehicle air conditioners, a connecting portion of the boss portion on the upstream side with respect to the air-circulation direction may have a smooth curved surface.

With the above-described aspect, because the connecting portion of the boss portion on the upstream side with respect to the air-circulation direction has the smooth curved surface, it is possible to guide, by means of the Coanda effect, the airflow flowing through the air channel at the interior of the case main unit to the primary-air introducing unit of the aspirator along the smooth curved surface at the connecting portion of the boss portion on the upstream side with respect to the air-circulation direction. Therefore, it is possible to introduce a necessary and sufficient amount of airflow into the aspirator; it is possible to increase the aspirator performance and to simplify the configuration thereof; and it is also possible to increase the degree of freedom in terms of the layout of the air conditioning unit and the degree of freedom for implementing the measures for enhancing the air-mixing efficiency and the temperature-adjustment controllability.

With vehicle air conditioner according to the aspect of the present invention, in any one of the above-described vehicle air conditioners, the boss portion may be provided in an air-mixing region of the air channel or in a downstream region thereof.

With the above-described aspect, because the boss portion is provided in the air-mixing region of the air channel or in a downstream region of the air-mixing region, it is possible to introduce into the aspirator, as the primary air, the temperature-adjusted air from the air-mixing region or a relatively large area of the operating region of the mode-switching damper downstream of the air-mixing region, and it is possible to blow the air into the vehicle cabin directly from the diffuser. Therefore, the air conditioning performance is not adversely affected even if the amount of primary air introduced into the aspirator is increased; it is possible to simplify the configuration while ensuring the required air conditioning performance; and it is possible to increase the degree of freedom in terms of the layout of the air conditioning unit and the degree of freedom for implementing measures for enhancing the air-mixing efficiency and the temperature-adjustment controllability.

Advantageous Effects of Invention

With the present invention, by reducing the pressure loss due to bending of an airflow being guided from an air channel at the interior of a case main unit to a primary-air introducing unit of an aspirator, it is possible to introduce a sufficient amount of airflow into the aspirator as the primary air and to suck in, as the secondary air, a sufficient amount of the air in a vehicle cabin toward an installation portion of an indoor temperature sensor, even if a guide is omitted, and also, even if the internal static pressure is low; therefore, it is possible to increase the detection precision of the temperature in the vehicle cabin and to enhance the temperature-adjustment controllability. Because it is possible to eliminate the need for a guide for introducing the primary air, it is possible to install the aspirator in a large area in a downstream region of an air-mixing damper without interfering with a mode-switching damper or the like, or without having to employ a special structure, and therefore, it is possible to increase the degree of freedom in terms of the layout of the air conditioning unit and, additionally, the degree of freedom for implementing measures for enhancing the air-mixing efficiency and the temperature-adjustment controllability.

DESCRIPTION OF EMBODIMENT

An embodiment of the present invention will be described below with reference to FIGS. 1 and 2.

Figure 1:
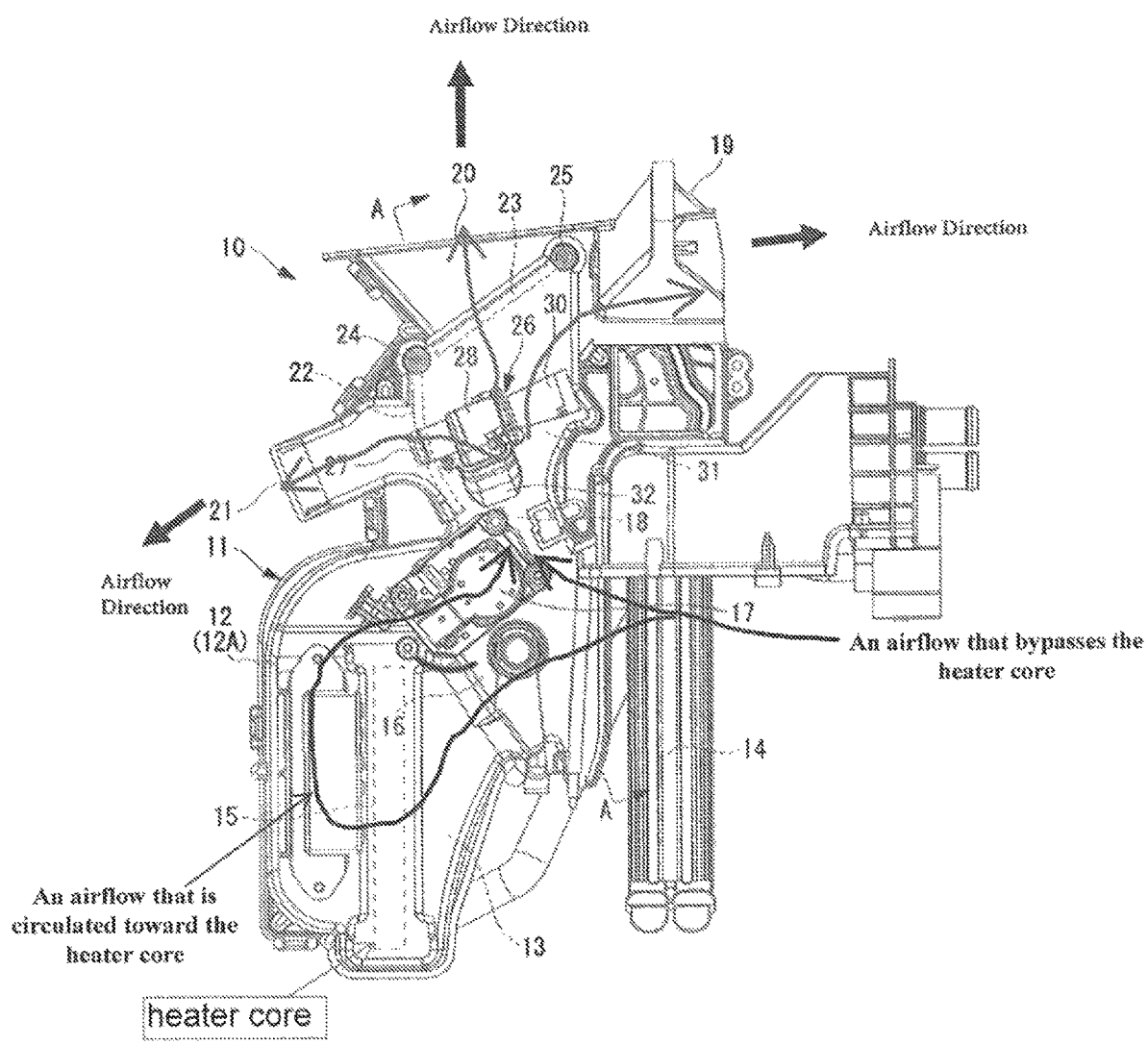
FIG. 1 is a side view of a main portion of a vehicle air conditioner according to an embodiment of the present invention.
Figure 2:
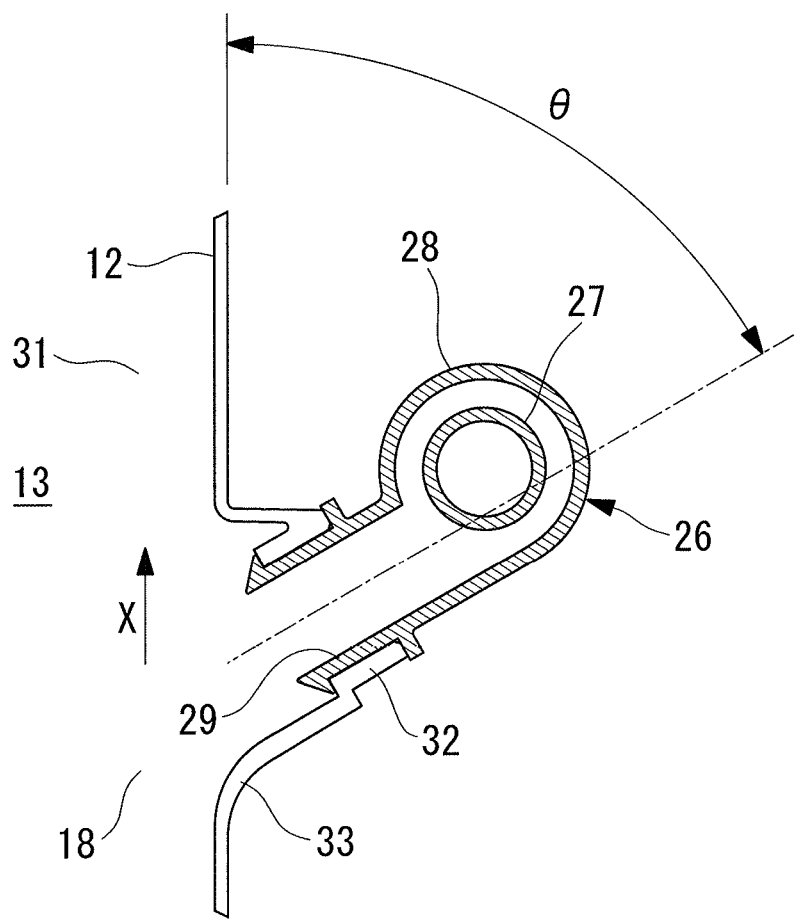
FIG. 2 is a cross-sectional view taken along A-A in FIG. 1.

FIG. 1 shows a side view of a main portion of a vehicle air conditioner according to an embodiment of the present invention, and FIG. 2 shows a cross-sectional view thereof taken along A-A.

A vehicle air conditioner 10 is provided with an air conditioning unit (HVAC unit; Heating Ventilation and Air Conditioning Unit) 11 that adjusts the temperature of vehicle exterior air (outdoor air) or vehicle interior air (indoor air), which is introduced by a blower unit (not shown) via an indoor-outdoor air switching damper, and that blows this air into a vehicle cabin.

The air conditioning unit (HVAC unit) 11 is provided with a case main unit 12 (only an upper case 12A of the case main unit 12 is shown in FIG. 1), the interior of which serves as an air channel 13. As is publically known, an evaporator, a heater core, an air-mixing damper, and so forth are sequentially disposed in the air channel 13 from the upstream side thereof. Note that, in the case main unit 12, the evaporator, the heater core, and the air-mixing damper are installed inside an evaporator installation portion 14, a heater core installation portion 15, and an air-mixing damper installation portion 16, respectively, and the air-mixing damper can be rotated about a rotation shaft by means of an actuator 17, such as a motor or the like.

This air conditioning unit 11 is configured such that the air blown thereinto by the blower unit is circulated toward the evaporator; after the air is cooled therein, the flow-volume ratio between an airflow that is circulated toward the heater core and an airflow that bypasses the heater core is adjusted by the air-mixing damper; the airflow that has circulated through the heater core and the airflow that has bypassed the heater core are mixed and adjusted to a predetermined temperature in an air-mixing region 18 downstream of the air-mixing damper; and, subsequently, the air is blown into the vehicle cabin selectively from a defroster vent 19, a face vent 20, a foot vent 21, or the like, provided on the downstream side of the air-mixing region 18, thus adjusting the temperature in the vehicle cabin to a set temperature.

The temperature-adjusted air can be blown into the vehicle cabin by switching among a plurality of blowing-mode switching dampers, such as a foot damper 22, a defroster/face damper 23, and so forth, provided on the downstream side of the air-mixing region 18, so that the blowing mode is selectively switched among a foot mode, a face mode, a defroster mode, a defroster/foot mode, a bi-level mode, and so forth. The foot damper 22 and the defroster/face damper 23 can be rotated about rotation shafts 24 and 25, respectively, by means of actuators, such as motors or the like.

With the above-described vehicle air conditioner 10, the temperature in the vehicle cabin needs to be detected with high precision in order to adjust the temperature in the vehicle cabin to the set temperature. As is publically known, an indoor temperature sensor that detects the temperature in the vehicle cabin is disposed at a sensor installation portion provided in an instrument panel in the vehicle cabin, and the temperature in the vehicle cabin is detected by circulating the air in the vehicle cabin toward the sensor installation portion. In order to circulate the air in the vehicle cabin toward the sensor installation portion, an aspirator 26 that utilizes a fluid to decrease pressure by means of the Venturi effect is employed.

The aspirator 26 is provided with a nozzle 27 that sucks in, as secondary air, the air in the vehicle cabin via the installation portion of the indoor temperature sensor, a main unit 28 that forms an air channel so as to surround the outer circumference of the nozzle 27, a primary-air introducing unit 29 that introduces, as primary air, a portion of an airflow circulating inside the air conditioning unit into the air channel of the main unit 28, and a diffuser 30 that is connected to an open end of the main unit 28 and that is configured such that the tip of the nozzle 27 opens in the vicinity of a throat portion of the diffuser 30; in this case, it is possible to employ a publically known aspirator 26, as described above.

This aspirator 26 is securely installed on an external surface of the case main unit 12 so that the primary-air introducing unit 29 thereof communicates with the air channel 13 at the interior of the case main unit 12, and the aspirator 26 is installed such that an air pipe from the sensor installation portion is connected to one end of the nozzle 27 of the aspirator 26 and so that the air in the vehicle cabin is sucked in as the secondary air and released into the vehicle cabin from the diffuser 30 together with the primary air introduced from the air channel 13.

Now, a structure for installing the aspirator 26 will be described in more detail by using FIG. 2.

At a side surface of the case main unit 12, a boss portion 32 that protrudes diagonally outward so as to face an airflow that flows in the direction of an arrow X, upward from the bottom, is provided so as to communicate with an air-mixing region 18 of the air channel 13 at the interior side thereof or an operating region 31 of the blowing-mode switching damper (foot damper 22) in a downstream region thereof, and the primary-air introducing unit 29 of the aspirator 26 is installed by being diagonally inserted into the boss portion 32.

In other words, the boss portion 32, in which the aspirator 26 is installed, is disposed so as to protrude outward from the external surface of the case main unit 12 and so as to diagonally face, at an angle $\theta$ equal to or less than 60°, the circulation direction X of the air flowing upward from the bottom, and the aspirator 26 is installed by being inserted into this boss portion 32 from outside. In addition, a connecting portion of the boss portion 32 on the upstream side with respect to the air-circulation direction X has a smooth curved surface 33 so that the airflow is guided along this curved surface 33 toward the primary-air introducing unit 29 of the aspirator 26.

This embodiment having the above-described configuration affords the following operational advantages.

In the above-described vehicle air conditioner 10, the outdoor air or the indoor air sucked in via the blower unit is cooled and/or heated at the evaporator and the heater core while being circulated through the air channel 13 formed in the case main unit 12 of the air conditioning unit (HVAC unit) 11, and is adjusted in the air-mixing region 18 via the air-mixing damper to temperature-adjusted air having the set temperature. The temperature-adjusted air is fed downstream via the air-mixing region 18, is blown into the vehicle cabin from one of the defroster vent 19, the face vent 20, and the foot vent 21 selected via the mode-switching dampers 22, and 23, and is utilized to adjust the temperature in the vehicle cabin.

Although the vehicle air conditioner 10 is controlled so that the temperature in the vehicle cabin reaches the set temperature, in order to increase the controllability and responsiveness thereof, the temperature in the vehicle cabin must be detected with high precision. Although the temperature in the vehicle cabin is detected by the indoor temperature sensor installed in the sensor installation portion of the instrument panel, in order to increase the detection precision thereof, it is necessary to circulate a sufficient amount of the vehicle interior air toward the sensor installation portion, and thus, the air in the vehicle cabin is sucked in and circulated via the aspirator 26 as the secondary air.

The aspirator 26 introduces a portion of the air circulating in the air channel 13, and, by decreasing the pressure by means of the Venturi effect by utilizing the introduced air as the primary air, sucks in, as the secondary air, the air in the vehicle cabin from the sensor installation portion via the air pipe, thus circulating the vehicle interior air through the sensor installation portion; in order to achieve satisfactory circulation of the vehicle interior air through the sensor installation portion, a sufficient amount of the primary air must be introduced from the air channel 13 via the primary-air introducing unit 29.

With this embodiment, the case main unit 12 is provided with the boss portion 32 that communicates with the air channel 13 at the interior of the case main unit 12 and that protrudes diagonally outward so as to face the air-circulation direction X, and the primary-air introducing unit 29 of the aspirator 26 is installed by being diagonally inserted into the boss portion 32. Accordingly, by reducing the pressure loss due to bending of the airflow being guided from the air channel 13 at the interior of the case main unit 12 to the primary-air introducing unit 29 of the aspirator 26, it is possible to introduce a sufficient amount of airflow into the aspirator 26 as the primary air and to suck in, as the secondary air, a sufficient amount of the air in the vehicle cabin toward the installation portion of the indoor temperature sensor, even if a guide is omitted, and also, even if the internal static pressure is low.

Figure 3:
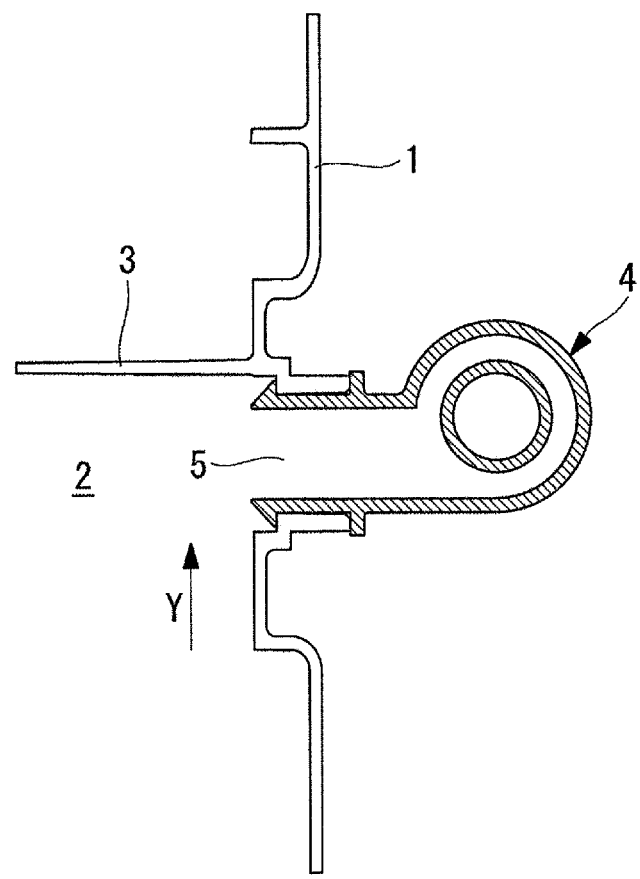
FIG. 3 is a diagram of a vehicle air conditioner of the related art, corresponding to the cross-section taken along A-A.

Note that, when an example according to the related art shown in FIG. 3, in which the guide 3 is omitted, and the one according to this embodiment shown in FIG. 2 were compared under the same conditions and the air speed at the sensor installation portion was measured, results showed that an air speed of at least 0.7 m/s was achieved with the one according to this embodiment when the angle θ was 60°, whereas the air speed for the example shown in FIG. 3 (without a guide) was 0.3 m/s, thus confirming that it is possible to achieve sufficiently high performance even with a configuration in which a guide is omitted. In particular, because dynamic pressure can be utilized when the aspirator 26 is diagonally installed, as described above, it is possible to introduce a sufficient amount of the vehicle interior air toward the sensor installation portion even during cooling when the internal static pressure is decreased.

Accordingly, it is possible to increase the detection precision of the temperature in the vehicle cabin and to enhance the temperature-adjustment controllability of the vehicle air conditioner 10. Because it is possible to eliminate the need for a guide for introducing the primary air, like the one shown in FIG. 3, it is possible to install the aspirator 27 in a large area in the downstream region of the air-mixing damper without interfering with the mode-switching damper (for example, foot damper 22) or the like, or without having to employ a special structure, and thus, it is possible to increase the degree of freedom in terms of the layout of the air conditioning unit 11 and the degree of freedom for implementing measures for enhancing the air-mixing efficiency and the temperature-adjustment controllability.

Because the boss portion 32 is disposed so as to diagonally face the air-circulation direction X at an angle θ equal to or less than 60°, as compared with the one according to the related art in which the aspirator 26 is installed by providing the boss portion in a direction that substantially perpendicularly intersects the air-circulation direction X, it is possible to considerably reduce the pressure loss due to bending of the airflow guided to the primary-air introducing unit 29 of the aspirator 26, and it is possible to introduce a sufficient amount of the primary air into the aspirator 26 without having to provide a guide or the like. Therefore, it is possible to increase the degree of freedom in terms of the layout of the air conditioning unit 11 and the degree of freedom for implementing the measures for enhancing the air-mixing efficiency and the temperature-adjustment controllability, while simplifying the configuration via the enhancement of the aspirator performance.

The connecting portion of the boss portion 32 on the upstream side with respect to the air-circulation direction X has the smooth curved surface 33. Because of this, it is possible to guide, by means of the Coanda effect, the airflow flowing through the air channel 13 at the interior of the case main unit 12 to the primary-air introducing unit 29 of the aspirator 26 along the smooth curved surface 33 at the connecting portion of the boss portion 32 on the upstream side with respect to the air-circulation direction X. By doing so, it is possible to introduce a necessary and sufficient amount of airflow into the aspirator 26; it is possible to increase the aspirator performance and to simplify the configuration thereof; and it is also possible to increase the degree of freedom in terms of the layout of the air conditioning unit 11 and the degree of freedom for implementing the measures for enhancing the air-mixing efficiency and the temperature-adjustment controllability.

Because the boss portion 32 is provided in the air-mixing region 18 of the air channel 13 or in a downstream region of the air-mixing region 18, it is possible to introduce into the aspirator 26, as the primary air, the temperature-adjusted air from the air-mixing region 18 or a relatively large area of the operating region of the mode-switching damper 31 downstream of the air-mixing region 18, and it is possible to blow the air into the vehicle cabin directly from the diffuser 30. Therefore, the air conditioning performance is not adversely affected even if the amount of the primary air introduced into the aspirator 26 is increased; it is possible to simplify the configuration while ensuring the required air conditioning performance; and it is possible to increase the degree of freedom in terms of the layout of the air conditioning unit and the degree of freedom for implementing the measures for enhancing the air-mixing efficiency and the temperature-adjustment controllability.

The present invention is not limited to the invention according to the embodiment described above, and appropriate modifications are possible within a range that does not depart from the scope thereof. For example, although the configuration of the aspirator 26 is not particularly specified in the embodiment described above, any configuration may be employed so long as the aspirator is operated by introducing the air in the air conditioning unit 11 as the primary air.

The measures for enhancing the air-mixing efficiency and the temperature-adjustment controllability described in the above embodiment are a rib or a guide for adjusting the air direction provided inside the air-mixing region 18, on a surface of the air-mixing damper, or the like.

REFERENCE SIGNS LIST

10 vehicle air conditioner
11 air conditioning unit (HVAC unit)
12 case main unit
13 air channel
18 air-mixing region
26 aspirator
29 primary-air introducing unit
31 operating region of mode-switching damper
32 boss portion
33 curved surface (connecting portion)
θ angle with respect to air-circulation direction
X air-circulation direction

The invention claimed is:
1. A vehicle air conditioner comprising:
in a case main unit of an air conditioning unit,
an air channel provided in an interior of the case main unit,
an aspirator installed on an external surface of the case main unit, wherein
in the case main unit, inside an evaporator installation portion, a heater core installation portion, and an air-mixing damper installation portion are located sequentially from an upstream side of an airflow circulating in the air channel, an evaporator, a heater core, and an air-mixing damper are installed inside the evaporator installation portion, the heater core installation portion, and the air-mixing damper installation portion, respectively, in a downstream side of the evaporator, a flow-volume ratio between an airflow that is circulated toward the heater core and an airflow that bypasses the heater core is adjusted by a rotation of the air-mixing damper, an air-mixing region which mixes the airflow circulated toward the heater core and the airflow bypassed the heater core and which adjusts the mixed airflow to a predetermined temperature is located downstream of the air-mixing damper, on the air channel, a mode switching damper is provided on the downstream side of the air-mixing region in the air channel, the case main unit is provided with a boss portion that protrudes direclty from the air-mixing region or an operating region of the mode-switching damper and directly communicates with the air-mixing region or the operating region of the mode-switching damper and that protrudes and opens diagonally outward so as to face an air-circulation direction, the boss portion is disposed so as to diagonally face the air-circulation direction at an angle $\theta$ equal to or less than 60° toward the air-circulation direction, when the air-circulation direction is the direction of 0° in a region where an opening of the boss portion protrudes directly, and an air introducing unit of the aspirator is installed by being diagonally inserted into the boss portion.

2. A vehicle air conditioner according to claim 1, wherein a connecting portion of the boss portion on the upstream side with respect to the air-circulation direction has a smooth curved surface.

* * * * *